United States Patent [19]

Furuhashi

[11] Patent Number: 5,177,636
[45] Date of Patent: Jan. 5, 1993

[54] LENS BARREL FOR A MICROSCOPE

[75] Inventor: Hidehiko Furuhashi, Fujisawa, Japan

[73] Assignee: Nikon Corporation, Tokyo, Japan

[21] Appl. No.: 765,241

[22] Filed: Sep. 25, 1991

[30] Foreign Application Priority Data

Oct. 1, 1990 [JP] Japan ................. 2-263306

[51] Int. Cl.⁵ ............................ G02B 21/00
[52] U.S. Cl. ................................. 359/384
[58] Field of Search ........... 359/384, 401, 377, 376, 359/554, 555, 556, 368

[56] References Cited

U.S. PATENT DOCUMENTS

| 2,138,665 | 11/1938 | Ott | 359/384 |
| 2,453,257 | 11/1948 | Ott | 359/384 |
| 4,175,826 | 11/1979 | Blaha et al. | 359/384 |
| 4,491,397 | 1/1985 | Barthelat et al. | 359/555 |
| 4,576,450 | 11/1986 | Westphal | 359/384 |
| 4,798,451 | 1/1989 | Fujiwara | 359/384 |

FOREIGN PATENT DOCUMENTS 43-5959 3/1968 Japan.
43-26270 11/1968 Japan.

Primary Examiner—Jon W. Henry
Attorney, Agent, or Firm—Shapiro and Shapiro

[57] ABSTRACT

A lens barrel for a microscope comprises an eyepiece barrel provided for rotation relative to a barrel body, a reflecting mirror holder for holding on the rotational center axis of the eyepiece barrel a reflecting mirror having a reflecting surface for reflecting light from an objective lens, and rotating the reflecting mirror about the rotational center axis, first and second circumferential surfaces having a ratio of outer diameters of approximately 1 to 2 and formed on the eyepiece barrel and the reflecting mirror holder, respectively, about the rotational center axis, a pulley rotatably supported on the barrel body, and a connecting member for connecting the first circumferential surface of the eyepiece barrel and the second circumferential surface of the reflecting mirror holder together through the pulley.

4 Claims, 3 Drawing Sheets

FIG. I

LENS BARREL FOR A MICROSCOPE

BACKGROUND OF THE INVENTION

1. Field of the Invention

This invention relates to a microscope lens barrel with an adjustable mount.

2. Related Background Art

Devices of this kind according to the prior art are shown in Japanese Patent Publication No. 43-5959 and Japanese Patent Publication No. 43-26270. In Japanese Patent Publication No. 43-5959, a lens barrel is supported by an L-shaped stay, which is mounted in a housing for pivotal movement about a shaft. A sheet is provided on a bracket pivotable about a shaft, and a reflecting mirror is mounted in such a manner that the center of rotation of the shaft is at the reflecting surface. An arcuate guide hole centering about the rotational axis of a rod and an arcuate guide hole centering about the imaginary rotational axis of an imaginary rod are formed in the stay and the housing, respectively, and these guide holes, with a slot formed in an arm constituting one end of the bracket, have the pivot shaft of the rod fitted therein. Design has been made such that when the stay is pivoted about the shaft, the bracket is rotated by the pivot shaft and the reflecting mirror is rotated by ½. In Japanese Patent Publication No. 43-26270, design has been made such that the ratio of rotation by a gear train is determined so that a prism may be rotated by ½ relative to the rotation of an eyepiece barrel.

The prior art of Japanese Patent Publication No. 43-5959 as described above has suffered from the problem that the dimensional accuracy of the distance between the shafts, the positional accuracy of the slot and arcuate holes and the back-lash of fitting affect the accuracy of the ½ rotation of the reflecting mirror relative to the rotation of the barrel.

The structure of Japanese Patent Publication No. 43-26270 using a gear train has suffered from the disadvantage that due to the error of the dimensions of the pitch circles of the gears, it is difficult to make the clearance zero during the meshing engagement between the gears and the movement of the gears becomes bad if the gears are forcibly or otherwise urged to eliminate the clearance.

SUMMARY OF THE INVENTION

The present invention has been made in view of such problems peculiar to the prior art and an object thereof is to accomplish the accurate ½ rotation of a reflecting mirror by simple structure without any back-lash relative to the rotation of an eyepiece barrel.

For the solution of the above-noted problems, a lens barrel according to the present invention may comprise an eyepiece barrel provided for rotation relative to a barrel body, and a reflecting mirror holder for holding on the rotational center axis of the eyepiece barrel a reflecting mirror having a reflecting surface for reflecting light from an objective lens, and for rotating the reflecting mirror about the rotational center axis, the reflecting mirror being rotated by half the amount of rotation of the eyepiece barrel to thereby correct for the shift in image position resulting from the rotation of the eyepiece barrel. First and second circumferential surfaces, e.g., circular portions, having a ratio of outer diameters of approximately 1-to-2 may be formed on the eyepiece barrel and the reflecting mirror holder, respectively, about the rotational center axis, and the outer peripheries of the first and second circumferential surfaces may be connected together by connecting members, such as belts, wires or cords, through a pulley rotatably supported on the barrel body.

In a preferred form of the invention the tip end of a connecting member fixed to the reflecting mirror holder is connected to a resilient member fixed to the barrel body to thereby impart tension to the connecting members.

Adjusting members for adjusting the distance between the rotary shaft of the pulley and the rotational center axis of the eyepiece barrel may also be provided between the pulley and the barrel body.

The direction of the tension by the resilient member may preferably be the direction in which the eyepiece barrel is raised.

In accordance with the invention as described above, the connecting members transmit a rotational force without any back-lash and therefore, the reflecting mirror holder smoothly follows the rotation of the eyepiece barrel, and the accuracy of the ½ rotation thereof depends on the accuracy of the ratio of diameters of the circumferential surfaces. The working of such surfaces with high accuracy can be done easily, thereby providing an inexpensive structure. In addition, when the position of the pulley is made adjustable as mentioned earlier, the distance between the centers of the pulley and the reflecting mirror holder may be changed so as to adjust the rotation angle of the reflecting mirror, whereby the center of the light ray from the objective lens can be properly and easily adjusted to the center of the eyepiece.

Further, by the use of a resilient member as noted above, tension is constantly imparted to the connecting members and thus, not only the movement of the reflecting mirror holder is very smooth, but also the adjustment of the angle of the reflecting mirror can be accomplished smoothly and easily. The tension of the resilient member, such as a tension coil spring, may advantageously act in a direction against the direction in which the eyepiece barrel tends to fall from gravity, thus eliminating the inconvenience that the eyepiece barrel falls naturally.

BRIEF DESCRIPTION OF THE DRAWINGS

The various features and advantages of the invention will be more fully appreciated from the detailed description hereinafter taken in conjunction with the accompanying drawings in which.

DETAILED DESCRIPTION OF THE PREFERRED EMBODIMENTS

Figure 1:
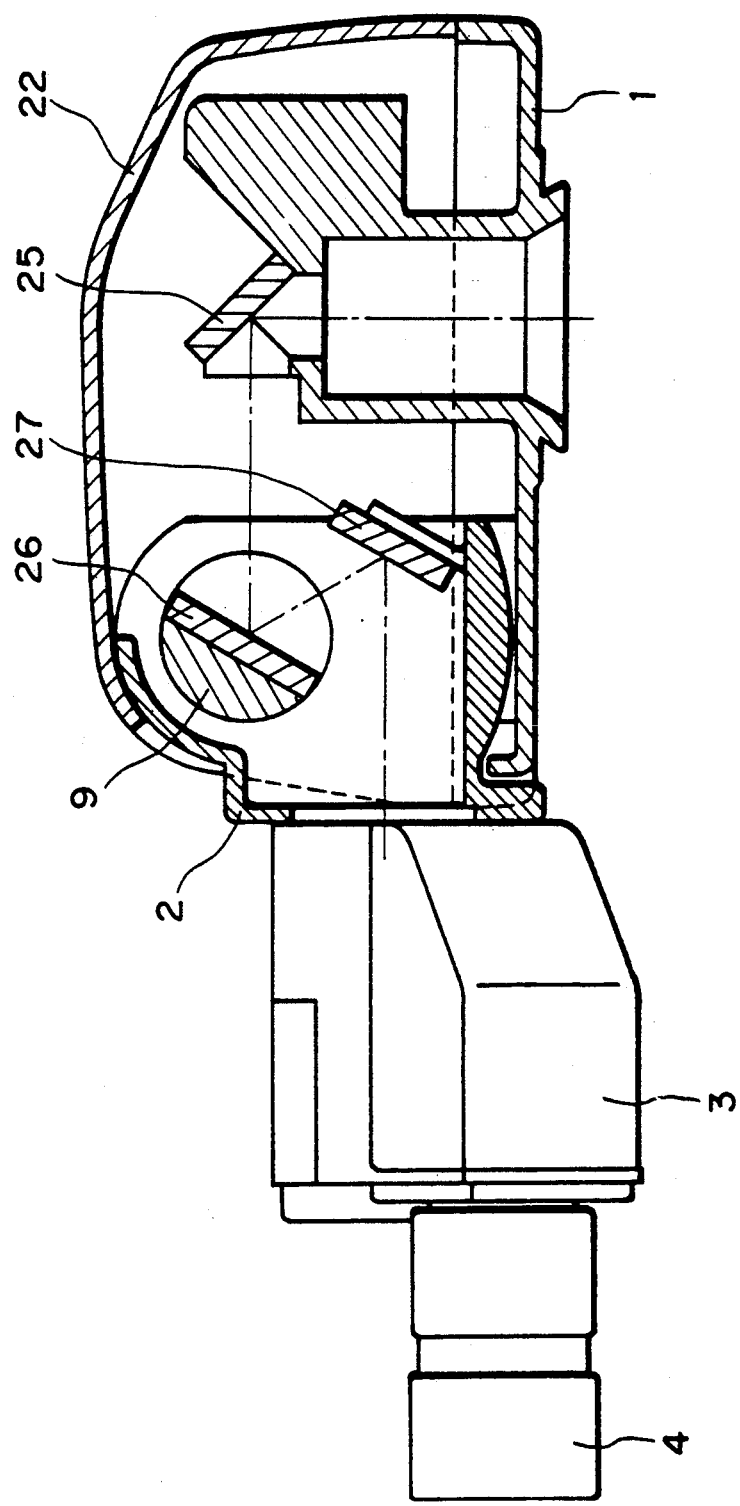
FIG. 1 is a longitudinal cross-sectional view through the center and along the optical axis of a device according to the present invention.
Figure 2:
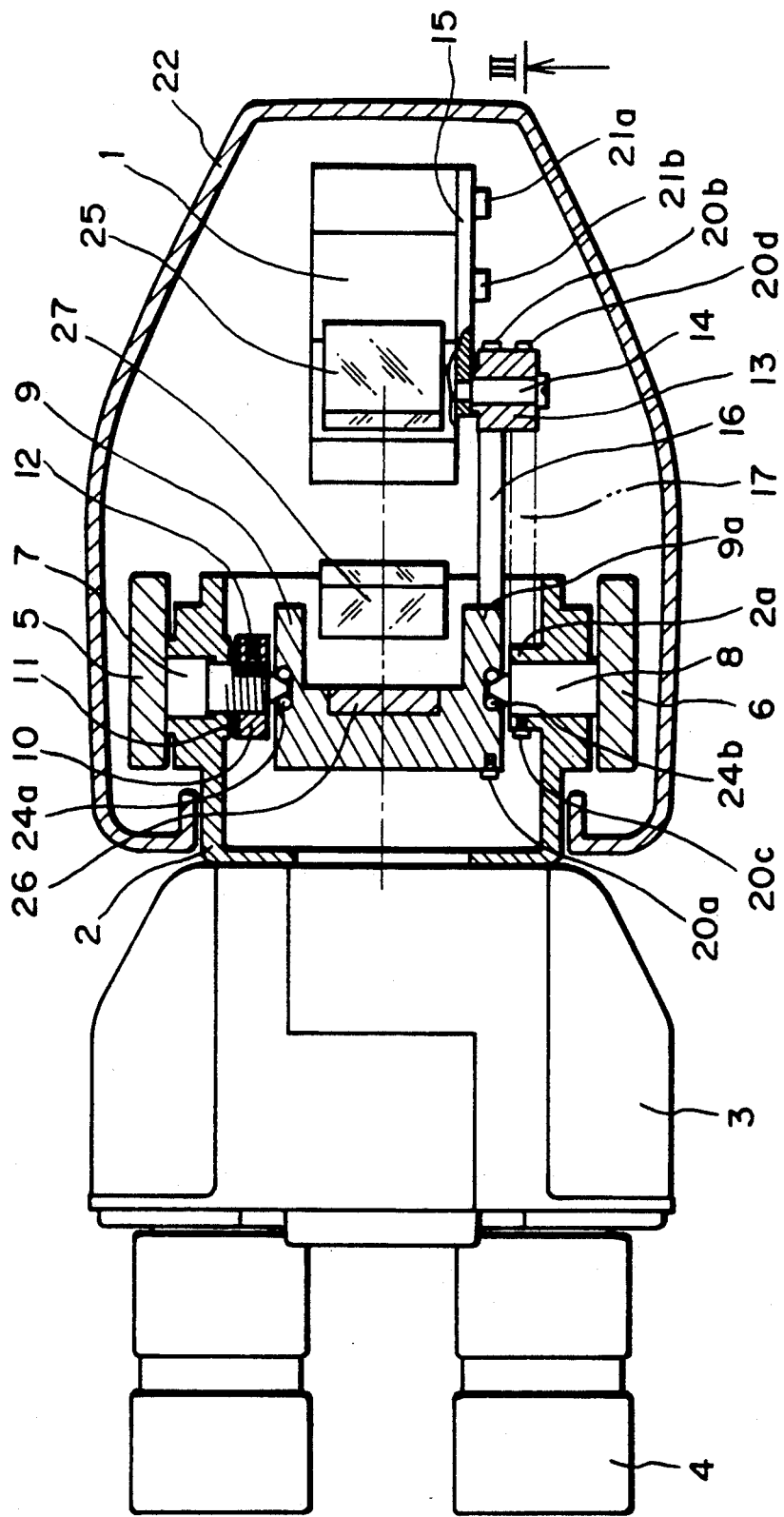
FIG. 2 is a cross-sectional view of the rotational center portion of an eyepiece barrel portion.
Figure 3:
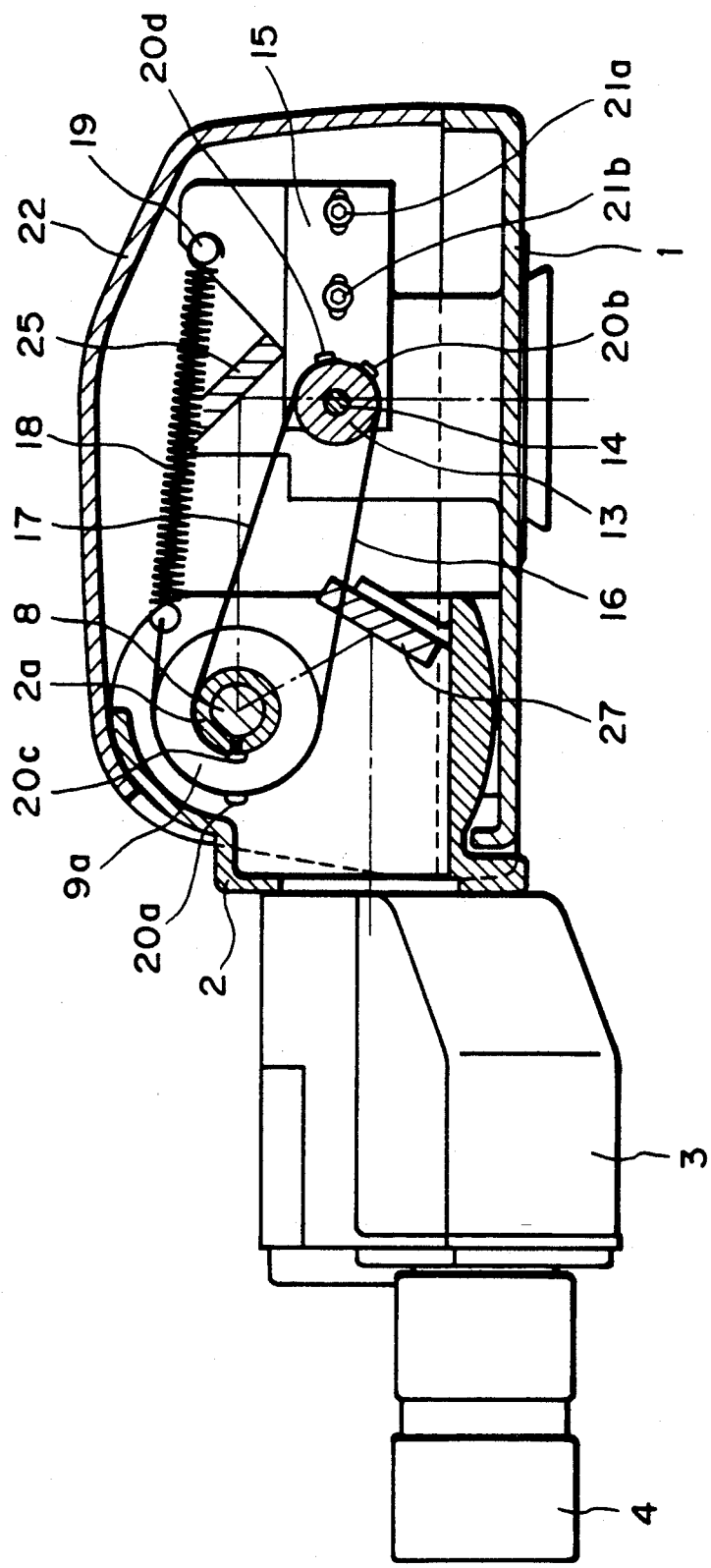
FIG. 3 is a cross-sectional view in the direction of arrow III in FIG. 2.

FIGS. 1, 2 and 3 show an embodiment of the present invention. As shown in FIG. 2, a barrel body 1 has a screen 5 and a screen 6, and shafts 7 and 8 rotatably fitted to a bearing provided on the holder 2 of an eyepiece barrel 3 are secured to the screens 5 and 6, respectively. The shaft 7 is formed with threads and imparts a frictional force to the rotation of the holder 2 by a nut 10 through a belleville spring 11. A set screw 12 prevents the rotation of the nut 10 relative to the shaft 7.

The tip ends of the shafts 7 and 8 are conical and cooperate with balls 24a and 24b to form pivot bearings, and pivotably hold a reflecting mirror holder 9 to which a reflecting mirror 26 is fixed so that the reflecting surface thereof may coincide with the center of rotation. As shown in FIGS. 2 and 3, one end of a belt 16 half-wound on one end 9a of the reflecting mirror holder 9 is coupled to one end of a tension coil spring 18 and is fixed to the end 9a of the reflecting mirror holder 9 by means of a screw 20a. The other end of the belt 16 is fixed to a pulley 13, rotatably held on the barrel body 1, by means of a screw 20b. The other end of the tension coil spring 18 is secured to a shaft 19 fixed to the barrel body 1. As shown in FIGS. 2 and 3, a belt 17 is fixed to the outer diameter of a bearing 2a at one end of the holder 2 by means of a screw 20c, and the other end of the belt 17 is fixed to the pulley 13 by means of a screw 20d. The pulley 13 is rotatably fixed to a plate 15 by means of a pulley shaft 14, and the plate 15 is fixed to the barrel body 1 by bolts 21a and 21b through a slot enabling adjustment of the distance between the center axis of the pulley 13 and the center of rotation of the holder 2 and the reflecting mirror holder 9. Accordingly, by changing the distance between the center axis of the pulley 13 and the center of rotation of the holder 2 and the reflecting mirror holder 9, the inclination of the reflecting mirror 26 can be adjusted. A reflecting mirror 25 is fixed to the barrel body 1 and deflects the light ray from objective lens toward the reflecting mirror 26. A reflecting mirror 27 is fixed to a reflecting mirror receptacle provided in the holder 2 and directs the light ray from the reflecting mirror 26 to eyepiece barrel 3. Eyepieces 4 are mounted on the eyepiece barrel 3. The diameter of the mounting portion 9a of the reflecting mirror holder 9 for the belt 16 is designed to be twice as great as the outer diameter of the bearing 2a of the holder 2 if the belts 16 and 17 are sufficiently thin. If the belts 16 and 17 are thick, ½ of the thickness of the belts may be added to the outer diameter of the bearing 2a, and the diameter of the mounting portion 9a for the belt 16 may be designed to be twice as great as the resulting sum.

When the eyepiece barrel is rotated and changed to a readily observable angle, the bearing 2a is rotated and the force is transmitted to the belt 17, the pulley 13 and the belt 16 to rotate the reflecting mirror holder 9. The angle of rotation of the reflecting mirror holder 9 is ½ of the angle of rotation of the eyepiece barrel 3 due to the ratio of the diameter of mounting portion 9a for the belt 16 to the outer diameter of bearing 2a. The direction of the tension of the tension coil spring 18 is such that the belts 16 and 17 may always hold tension, that is, the direction in which the eyepiece barrel 3 is raised.

The reference numeral 22 designates the cover of the lens barrel.

The belts 16 and 17 used in the abovedescribed embodiment may be replaced by other connecting members such as cords or wires.

Further, instead of one end of the belt 16 being coupled to the tension coil spring 18, one end of the belt 16 may be fixed to the pulley 13. In this case, the tension coil spring 18 becomes unnecessary.

As described above, according to the present invention, when the user of the microscope has changed the angle of the eyepiece barrel to a readily usable position, the reflecting mirror 26 can be rotated accurately by one-half the angle of rotation of the eyepiece barrel so that the position of the observed image will not change in the field of view. In addition, there is the advantage that the adjustment of the reflecting mirror 26 for directing the light ray from the objective lens accurately to the eyepieces can be accomplished simply by moving the position of the pulley, without providing any special adjusting mechanism in the rotational reflecting mirror portion. Moreover, the movement of the reflecting mirror is smooth and the adjustment of the angle thereof can be accomplished smoothly and easily. Further still, the tension of the tension coil spring is well balanced with the weight of the eyepiece barrel and the rotative frictional force imparted can be minimized, thus enhancing the smoothness of rotation.

What is claimed is:

1. A lens barrel for a microscope including:
   an eyepiece barrel provided for rotation relative to a barrel body;
   a reflecting mirror holder for holding on the rotational center axis of said eyepiece barrel a reflecting mirror having a reflecting surface for reflecting light from an objective lens, and for rotating said reflecting mirror about said rotational center axis; and
   first and second circumferential surfaces formed on said eyepiece barrel and said reflecting mirror holder, respectively, said first and second circumferential surfaces having respective centers of curvature coincident with said rotational center axis and having a ratio of diameters of approximately 1-to-2;
   a pulley rotatably supported on said barrel body for rotation on an axis spaced from and substantially parallel to said rotational center axis;
   the spacing between said rotational center axis and said rotation axis of said pulley being adjustable; and
   elongate connecting means wound over and connecting said first circumferential surface, said second circumferential surface, and said pulley for transmitting rotation between said first circumferential surface and said second circumferential surface by way of said pulley.

2. A lens barrel for a microscope according to claim 1, wherein said connecting means includes a connecting member fixed to said second circumferential surface and having a tip end connected to a resilient member which is fixed to said barrel body and which imparts tension to said connecting member.

3. A lens barrel for a microscope according to claim 1, including:
   means adjustably fixing said pulley to said barrel body for adjusting the distance between a rotary shaft of said pulley and said rotational center axis.

4. A lens barrel for a microscope according to claim 2, wherein the direction of said tension imparted by said resilient member is the direction in which said eyepiece barrel is raised.

* * * * *